Figure 1:
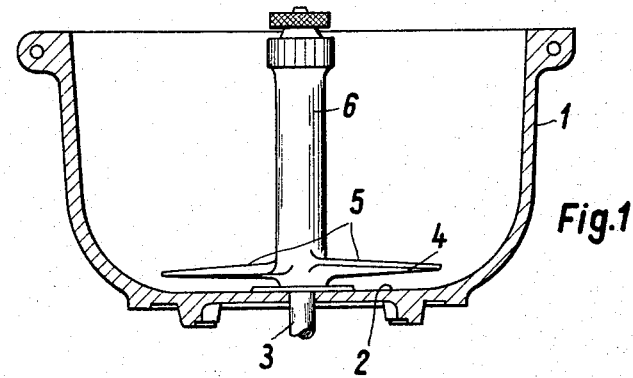

Nov. 22, 1966 F. OTTO 3,286,993

KNEADING APPARATUS

Filed May 11, 1964

Inventor:
Fritz Otto
by Michael J. Striker

United States Patent Office 3,286,993
Patented Nov. 22, 1966

3,286,993
KNEADING APPARATUS
Fritz Otto, Hameln (Weser), Germany, assignor to
A. Stephan u. Söhne, Hameln (Weser), Germany
Filed May 11, 1964, Ser. No. 366,256
Claims priority, application Germany, May 10, 1963,
St 20,586
12 Claims. (Cl. 259—107)

The present invention relates to a kneading apparatus.
More particularly, the present invention relates to apparatus for kneading materials such as edible dough and the like.

Known machines for manufacturing dough or similar materials which acquire a stretchy dough-like consistency during kneading take very many different forms. For example, kneading tools can be accommodated within stationary or rotating bowls in such a way that they rotate about central or eccentric axes or even about a horizontal axis, and the kneading tools can for example rotate about their own axes while simultaneously rotating about additional axes, and they can have hook-shaped configurations or grid-like configurations or even take the form of propeller or knife blades.

All of these known constructions have their own particular advantages for particular purposes. For example, some of the machines are particularly suitable for preparing relatively small amounts of material while others are particularly designed to provide large amounts of material, and some are designed to handle easily workable material while others are particularly designed to handle material of very thick consistency.

However, all known machines of this type suffer from one common defect. Thus, there is at the present time no known machine capable of kneading a relatively large amount of material without putting an undesirably large load on the driving motor while at the same time providing the completed kneaded material in an extremely short time so that the operations are very economical.

It is therefore a primary object of the present invention to solve this problem by providing an apparatus capable of very quickly kneading a relatively large amount of material to the desired consistency without excessively loading a motor which in a conventional machine would be incapable of achieving the results of the invention unless it were overloaded.

A further object of the present invention is to provide an apparatus of this type which is exceedingly simple, rugged, and inexpensive.

Also, it is an object of the present invention to provide an apparatus which can be used for the most varied purposes, so that the range of possible uses of the structure of the invention is far beyond what is possible with conventional machines which provide optimum operations only when used for a specific job.

With these objects in view the invention includes, in a kneading apparatus, a container which has a bottom wall and a cylindrical side wall extending from the bottom wall and surrounding a substantially central axis which is substantially perpendicular to the bottom wall. A shaft extends along this axis in the interior of the container and is connected to the bottom wall for rotation relative thereto. A plurality of kneading blades are fixed to the shaft for rotation therewith, are located adjacent to the bottom wall, and in accordance with the invention these blades extend from the shaft over the bottom wall by a distance of from ½ to ⅔ of the distance between the shaft and side wall, and furthermore in accordance with the present invention each blade has a lower surface directed toward the bottom wall and situated in a plane which intersects the bottom wall at an angle of up to 10°.

Figure 2:
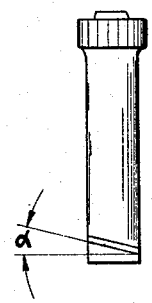
Figure 3:
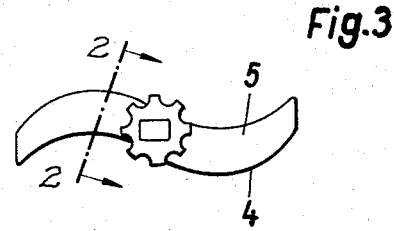

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional elevation of one possible embodiment of a structure according to the present invention;
FIG. 2 shows the shaft with one of the blades illustrated in FIG. 2 in a section taken along line 2—2 of FIG. 3 in the direction of the arrows; and
FIG. 3 is a top plan view of the shaft and blade assembly of the invention.

Referring now to FIG. 1, there is shown therein a bowl or container 1 having a bottom wall 2 which at its inner surface, in the interior of the container 1, is flat or at least substantially flat, and the container 1 has a cylindrical side wall extending upwardly from the bottom wall 2 and merging smoothly into the latter, as is apparent from FIG. 1. The cylindrical side wall of the container surrounds a central axis which is perpendicular to the inner flat surface of the bottom wall 2, and an elongated shaft 6 extends along this central axis in the interior of the container 1. The bottom wall 2 is formed with a central aperture through which an extension 3 of the shaft 6 extends to be connected in any known way to a suitable motor or motor and transmission, so that the shaft 6 is connected to the wall 2 for rotation relative thereto and is adapted to be driven by a drive which rotates the extension 3 of the shaft 6.

A pair of kneading blades 5 respectively have inner and outer ends, and these blades 5 are fixed at their inner ends to the shaft 6, as by being formed integrally therewith. The blades 5 are fixed to diametrically opposed portions of the shaft 6 and are situated closely adjacent to the bottom wall 2. As is apparent from FIG. 3 the pair of blades 5 form an elongated blade assembly which has a substantially S-shaped configuration. Also, as is apparent from FIG. 2 the lower surface 4 of each blade is situated in a plane which makes a predetermined angle $\alpha$ with the flat inner surface of the bottom wall 2.

Extensive investigation and testing has resulted in the surprising discovery that the results of the invention can be achieved with the above-described structure when the angle $\alpha$ is no greater than 10° and preferably is from 3 to 5° and when the outer ends of the blades 5 are situated at a distance of from ½ to ⅔ of the distance between the shaft 6 and the side wall of the container 1, and furthermore it has been found to be highly desirable not only to arrange the blades close to the bottom wall 2 but also to rotate the blades at a speed of at least 750 revolutions per minute. Moreover, the shaft 6 extends along the interior of the container 1 through a distance substantially equal to the length of the side wall thereof so that at all times the shaft 6 will extend through and beyond the material in the container to prevent the material from bridging over the central axis of the container. Such bridging of the material over the central axis would disadvantageously affect the kneading operations.

The speed of rotation of 750 revolutions per minute is only a minimum. In actual practice it has been found of greatest advantage to provide a speed of approximately 1500 revolutions per minute. Actual tests have shown that with a construction and operation as described above the rotary blades almost immediately assume the desired predetermined speed of rotation and maintain this speed of rotation without in any way overloading a motor which is of a conventional capacity for the size of the container and blades and while at the same time treating relatively large amounts of material in a manner which kneads the material while progressively increasing the stiffness thereof until the desired consistency of the material is achieved. It has moreover been found that even if the kneading of the material is interrupted the structure of the invention can be started again and without any excessive straining of the motor and rotary blades will almost immediately resume the desired speed of rotation. The shaft 6 of course prevents the material from bridging over the central axis so as to avoid any detrimental effect on the kneading operations.

Thus, the above-described features provide practically optimum relationships. The material which is to be treated can be handled not only in its normal initial condition but even if the kneading has progressed to a certain extent and the machine has stopped, it can again be restarted to continue the kneading operations which immediately progress from the point at which they were interrupted without any difficulties. The final product achieved with the process and apparatus of the invention has outstandingly good properties. As compared to other machines which have outputs comparable to that of the structure of the invention, the structure of the invention requires far less power and the machine can be started much easier either at the beginning of the kneading process or to continue an interrupted kneading process.

The structure of the kneading blades is such that during rotation they whirl the material in a repeated circulation along a path which first passes the material beneath the blades against the wall 2 and then advances the material outwardly against the side wall of the container, moving the material upwardly along this side wall and finally permitting the material to flow from the upper dege of the side wall back into the operating region of the kneading blades.

With the structure of the invention it has been found possible, for example, to knead to the desired final consistency approximately 18 kg. of flour with approximately 10 liters of water in 90 seconds with a motor of approximately 7.5 horsepower.

The structure of the invention provides the additional advantage of being capable of use for widely different purposes inasmuch as at the relatively high speed of its shaft the most widely different types of tools can be used, such as tools for cutting, mixing, etc.

It will be understood that each of the elements described above, or two or more together, may also find a useful application in other types of kneading apparatus differing from the types described above.

While the invention has been illustrated and described as embodied in kneading apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a kneading apparatus for dough and other edible materials, in combination, a container having a bottom wall including a central flat bottom wall portion and a cylindrical side wall extending upwardly from said bottom wall and surrounding a predetermined axis which is substantially perpendicular to said bottom wall; a rotary shaft extending along said axis in the interior of said container and connected to said bottom wall for rotation with respect thereto; and a plurality of kneading blades fixed to and projecting from said shaft in the interior of said container closely adjacent said central flat bottom wall portion thereof, each blade having a rearwardly curved cutting edge and a lower surface directed toward said bottom wall and located in a plane which makes with said bottom wall an angle of up to 10°, and each blade extending over from ½ to ⅔ the distance from said shaft to said side wall.

2. In a kneading apparatus for dough and other edible materials, in combination, a container having a bottom wall including a central flat bottom wall portion and a cylindrical wall extending upwardly from said bottom wall and surrounding a predetermined central axis which is substantially perpendicular to said bottom wall; a shaft extending along said axis in said container and connected to said bottom wall for rotation relative thereto, and kneading blades of substantially S-shaped configuration fixed to said shaft for rotation therewith, said blades being located closely adjacent to said central flat bottom wall portion and having outer ends spaced from said shaft by a distance equal to ½ to ⅔ the distance between said shaft and side wall, and each blade having a lower surface directed toward said bottom wall and situated in a plane which makes with said bottom wall an angle of between 3 and 5°.

3. In a kneading apparatus for dough and other edible materials, in combination, a container having a bottom wall including a central flat bottom wall portion and a cylindrical side wall extending upwardly from said bottom wall and surrounding a predetermined central axis which is is substantially perpendicular to said bottom wall; a shaft extending along said axis in said container and connected to said bottom wall for rotation relative thereto, said shaft extending from said bottom wall along the interior of said container through a substantial distance which is great enough to locate an end of the shaft distant from said bottom wall at all times beyond material which is kneaded in the container; and kneading blades of substantially S-shaped configuration fixed to said shaft closely adjacent said central flat bottom wall portion, and having outer ends situated at a distance of from ½ to ⅔ of the distance between said shaft and side wall, and said blades being uniformly distributed about said shaft and respectively having lower surfaces directed toward said bottom wall and respectively situated in planes which make with said bottom wall an angle of from 3 to 5°.

4. In a kneading apparatus for dough and other edible materials, in combination, a container having a bottom wall provided with a substantially flat inner surface and having a cylindrical side wall merging smoothly into said bottom wall and surrounding a predetermined central axis which is perpendicular to said flat surface of said bottom wall; a shaft extending along said axis in said container and connected to said bottom wall for rotation relative thereto; and a pair of kneading blades respectively having inner and outer ends and fixed at their inner ends to said shaft at diametrically opposed parts thereof so as to form a blade assembly of substantially S-shaped configuration, said outer ends of said blades respectively being spaced from said shaft by a distance of from ½ to ⅔ of the distance between said shaft and side wall, and said blades being located closely adjacent and substantially parallel to said flat inner surface of said bottom wall and respectively having lower surfaces directed toward said bottom wall and situated in planes which respectively make with said flat surface angles of between 3 and 5°.

5. An apparatus as recited in claim 4, wherein said blade assembly of S-shaped configuration is intersected at its center by said shaft.

6. An apparatus as recited in claim 4, wherein said shaft has in the interior of said container a length substantially equal to the length of said side wall so that said shaft will project through and beyond material kneaded in the container to prevent the material from bridging over the central axis of the container.

7. In a kneading apparatus for dough and other edible materials, in combination, a container having a bottom wall provided with a flat inner surface at the interior of the container and a cylindrical side wall merging smoothly into and extending from said bottom wall, said side wall surrounding a predetermined central axis which is perpendicular to said flat surface; a shaft extending along said axis in the interior of said container and having a length substantially equal to the length of said side wall, said shaft being connected to said bottom wall for rotation in a predetermined direction relative thereto; and a pair of kneading blades respectively having inner and outer ends and respectively fixed at their inner ends to diametrically opposed portions of said shaft, said blades being located closely adjacent and substantially parallel to said flat inner surface of said bottom wall and projecting from said shaft over said bottom wall, the outer ends of said blades being respectively located at a distance of from ½ to ⅔ of the distance between said shaft and side wall, and said blades together forming an elongated blade assembly of substantially S-shaped configuration which is interrupted substantially at its center by said shaft, and said blades respectively having lower surfaces directed toward said bottom wall, each inclined in the same direction relative to the direction of rotation of said shaft and blades therewith, and said lower surfaces being respectively situated in planes which intersect said flat surface of said bottom wall at angles of from 3 to 5°, respectively.

8. A kneading apparatus for dough and other edible materials comprising, in combination, a container having a bottom wall including a central bottom wall portion having a diameter equal to between one-half and two-thirds of the maximum diameter of said container and an upwardly curved annular peripheral portion having a width equal to at least one-third of said diameter, said container also having a side wall extending upwardly from said bottom wall and surrounding a predetermined axis which is substantially perpendicular to said bottom wall; a rotary shaft extending along said axis in the interior of said container and mounted on said bottom wall for rotation with respect thereto; and a plurality of kneading blades fixed to and projecting from said shaft in the interior of said container relatively closely adjacent to said central bottom wall portion, each blade having a lower face directed toward said bottom wall and located in a plane which makes with said central bottom wall portion a small acute angle, and each blade extending over from one-half to two-thirds of half of the diameter of said side wall.

9. A kneading apparatus according to claim 8, wherein each blade decreases in thickness from said shaft in direction to the tip thereof.

10. A kneading apparatus according to claim 8, including an elongated driving member extending through an opening in said central bottom wall portion upwardly into said container and wherein said shaft is a hollow shaft fitting onto said elongated driving member so as to be located with said blades relatively closely adjacent to said central bottom wall portion.

11. A kneading apparatus according to claim 10, including means for securing said elongated driving member located in said hollow shaft firmly to the latter so that said hollow shaft together with said blades can be rotated by rotation of said elongated driving member.

12. In a kneading apparatus for dough and other edible materials, in combination, a container having a bottom wall including a central bottom wall portion having a diameter equal to between one-half and two-thirds of the diameter of said bottom wall and an upwardly curved annular peripheral portion having a width equal to at least one-third of said diameter, said container also having a cylindrical side wall extending upwardly from said bottom wall and surrounding a predetermined axis which is substantially perpendicular to said bottom wall; a rotary shaft extending along said axis in the interior of said container and connected to said bottom wall for rotation with respect thereto; and a plurality of kneading blades fixed to and projecting from said shaft in the interior of said container closely adjacent to said central bottom wall portion, each blade having a lower face directed toward said bottom wall and located in a plane which makes with said central bottom wall portion an angle of between 3° and 10°, and each blade extending over from one-half to two-thirds the distance from said shaft to said side wall.

References Cited by the Examiner
FOREIGN PATENTS 356,587 10/1905 France.
160,163 8/1957 Sweden.

WALTER A. SCHEEL, *Primary Examiner.*

R. W. JENKINS, *Assistant Examiner.*